United States Patent
Adams et al.

(10) Patent No.: US 11,297,188 B2
(45) Date of Patent: Apr. 5, 2022

(54) HYBRID CLOUD PBX

(71) Applicants: Barrett Adams, Nine Mile Falls, WA (US); Michael Cramer, Bellevue, WA (US)

(72) Inventors: Barrett Adams, Nine Mile Falls, WA (US); Michael Cramer, Bellevue, WA (US)

( * ) Notice: Subject to any disclaimer, the term of this patent is extended or adjusted under 35 U.S.C. 154(b) by 0 days.

(21) Appl. No.: 16/385,705

(22) Filed: Apr. 16, 2019

(65) Prior Publication Data

US 2019/0320070 A1    Oct. 17, 2019

Related U.S. Application Data

(60) Provisional application No. 62/658,405, filed on Apr. 16, 2018.

(51) Int. Cl.
*H04M 7/00* (2006.01)
*H04L 65/1053* (2022.01)
*H04M 3/42* (2006.01)

(52) U.S. Cl.
CPC ...... *H04M 7/0084* (2013.01); *H04L 65/1053* (2013.01); *H04M 3/4234* (2013.01); *H04M 7/009* (2013.01)

(58) Field of Classification Search
None
See application file for complete search history.

(56) References Cited

U.S. PATENT DOCUMENTS

| | | | |
|---|---|---|---|
| 2006/0109976 A1* | 5/2006 | Sundaram | H04M 3/36 379/265.02 |
| 2010/0223494 A1* | 9/2010 | Degenhardt | H04L 65/1053 714/4.1 |
| 2010/0246575 A1* | 9/2010 | Hakusui | H04L 29/06027 370/352 |
| 2010/0272098 A1* | 10/2010 | Ferguson | H04L 12/66 370/352 |
| 2013/0272295 A1* | 10/2013 | von Wachter Mahler | H04L 12/6418 370/352 |
| 2015/0156616 A1* | 6/2015 | McComb | A61B 5/747 455/417 |
| 2016/0119179 A1* | 4/2016 | Palmer | H04L 41/0654 370/220 |

\* cited by examiner

*Primary Examiner* — Antim G Shah
(74) *Attorney, Agent, or Firm* — Gary L. Eastman, Esq.; Eastman IP

(57) ABSTRACT

Disclosed is a system for telephones by providing an improved and streamlined user experience and enhanced fail over mechanisms. A decentralized system managed through a web site which allows for continued operation even when the primary systems fail includes a mechanism for restoring the primary systems automatically when they become available again. Phones connect to two PBX systems at the same time, one local and one at a remote location. The two PBX systems synchronize configuration data and media files between them. The website can also be used to manage any number of systems allowing any size organization to manage every phone system in their organization from a single interface.

6 Claims, 14 Drawing Sheets

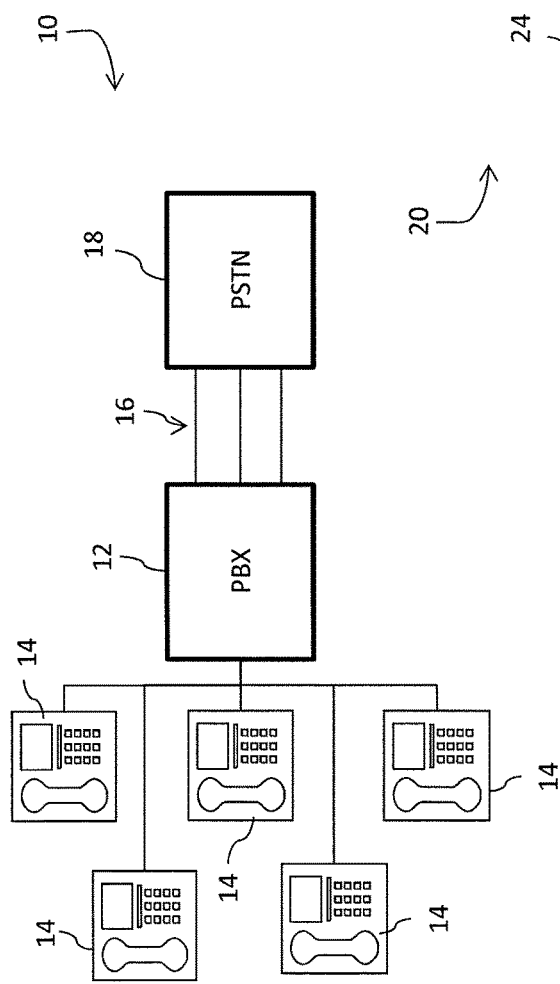
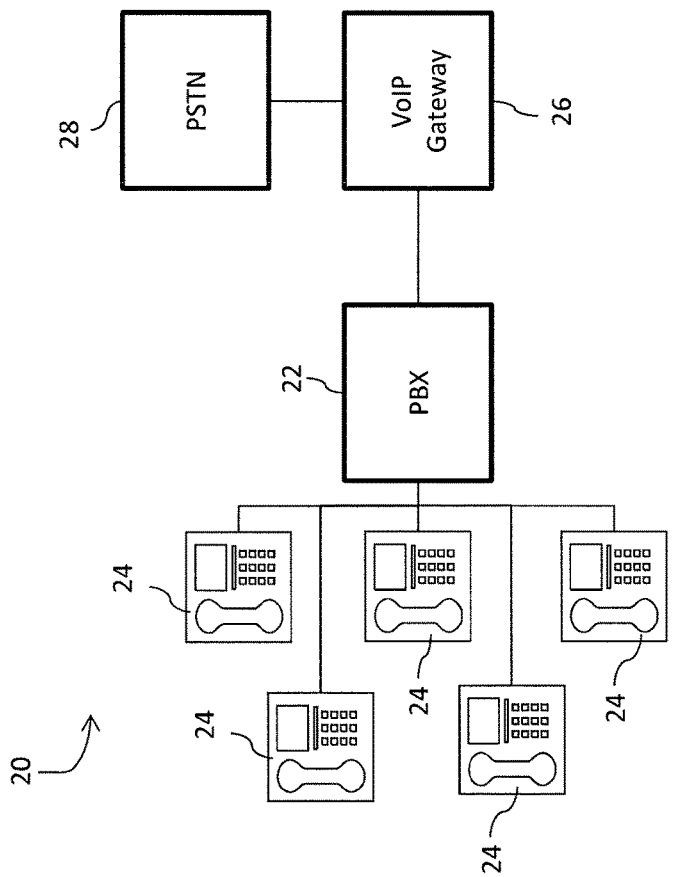
Fig. 1 (Prior Art)
Fig. 2 (Prior Art)

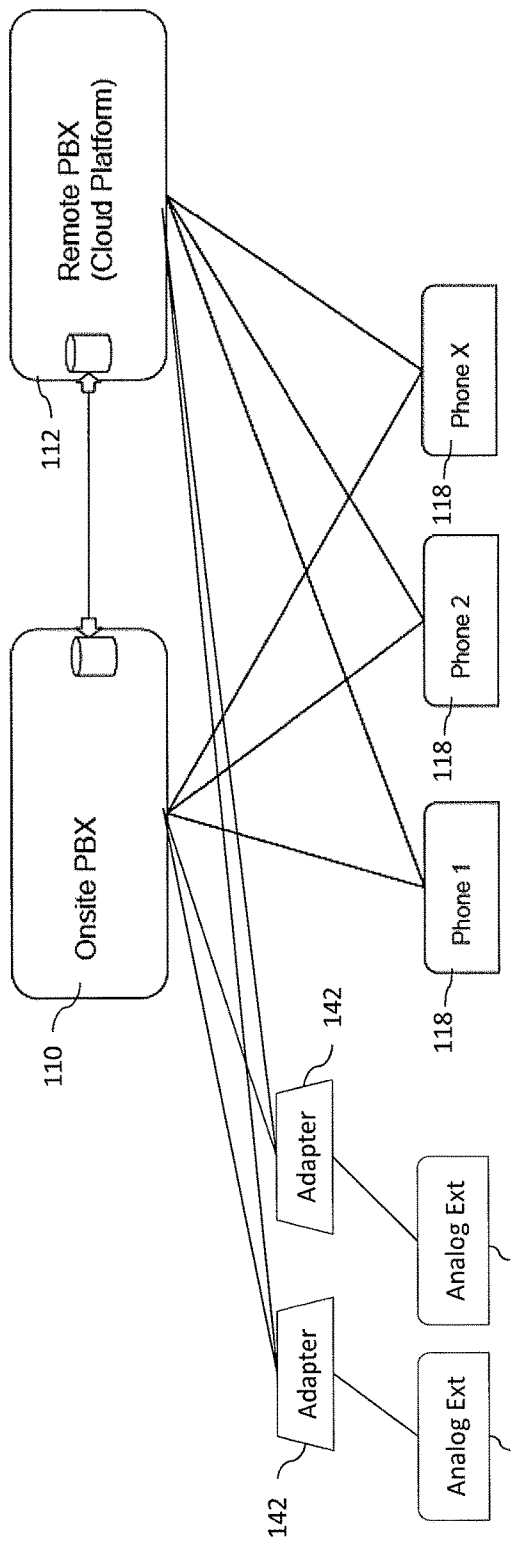
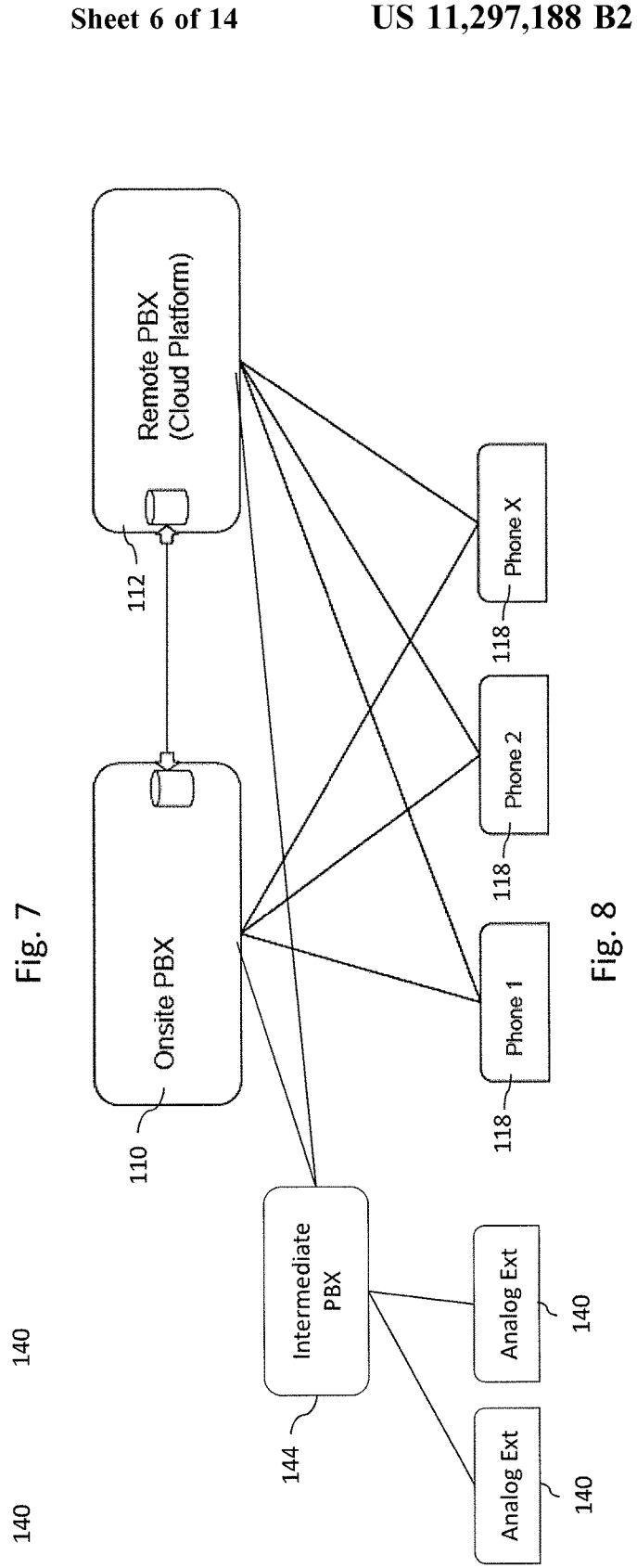
Fig. 7
Fig. 8

300 → SoundLine Portal    Admin ▾    Account ▾    Call Records ▾    Tools ▾

| Extension Number | 701 |
| Extension Name | Extension 701 |
| Cell Phone | 2069826370 |
| SIP Account | p12test701 |
| Alternate SIP Account | |
| Ringtone Override | |
| Ring Type | 1 - Normal Ring (Default) |
| Cell Carrier | |
| Exclude from menus | Yes ● no |
| Prefix CallerID | |
| Hours | |
| Extension VM Box | 701 - Extension 701 |
| Phone's VM Box | --none--<br>300 - default<br>701 - Extension 701<br>702 - Extension 702<br>Selected: 701 |
| Cell Forward Type | 1 - only on down |
| Ring Timeout (second) | 25 |
| Cell-Qualify | ● Yes ○ no |
| Sip Qualify | ○ Yes ● No |
| Pre-Process Rules | |
| No Answer Rule | v |
| Cell-Delay | 0 |

Fig. 15

| | | |
|---|---|---|
| | 701  Extension 701 | Edit  Delete  Config |
| 380 → | Ext | 701 |
| | Name | Extension 701 |
| | Cell Phone | 2069026370 |
| | Cell Phone Rings On? | Only on down |
| | Cell-Qualify | True |
| | Ext. VM. Box | 701 |
| | Device's VM Box | 701 |
| | Prefix CallerID | |
| | DID For Dial Out | |
| | Ring Timeout | 25 |
| | Cell Delay | 0 |
| | International Enabled? | True |
| | Time Zone | -8 |
| | Phone Config | --none-- |
| | Include On Phone Buttons? | True |
| | Class | |
| | MAC Address | |

Fig. 18

HYBRID CLOUD PBX

RELATED APPLICATIONS

This application claims the benefit of priority to U.S. Provisional Patent Application Ser. No. 62/658,405 filed Apr. 16, 2018, titled "Hybrid Cloud PBX", the entirety of which is hereby incorporated fully herein by this reference.

FIELD OF THE INVENTION

The present invention pertains generally to private branch exchanges. More particularly, the present invention pertains to a redundant private branch exchange configured to provide telephone service in the event the primary private branch exchange becomes inoperative. The Present invention is particularly, but not exclusively, useful as highly reliable business telephone system.

BACKGROUND OF THE INVENTION

Alexander Graham Bell is generally credited with the invention of the telephone in the late 1800s. Originally, a pair of telephones would be directly connected to each other. However, the ability to call only a single other party quickly proved too limiting, and switching systems were developed to build out early telephone networks. Originally, switching systems used manual switchboards. The caller would tell the switchboard operator who he or she wanted to call, and the operator would manually complete the circuit between the two parties. Automatic switching systems, which eliminated the need for interacting with a switchboard operator, were developed shortly thereafter. The automatic switching systems used patterns of pulses, and later sequences of DTMF tones, in order to determine the party being called.

Businesses and other organizations often employ their own switching system, known as a private branch exchange ("PBX"). A PBX allows the shared use of lines connecting the organization to the public switched telephone network ("PSTN") between the organization's telephones. Generally, the telephones in the PBX may also call each other without the use of the lines connecting the PBX to the PSTN.

Technological developments were incorporated into telephone networks over time, including fiber-optic cables, satellite communications, and packet-switching. Voice over IP ("VoIP") allows calls between an Internet-connected endpoint and an endpoint on a traditional PSTN. VoIP has greatly reduced the cost of telephone service for many of its users, but the reduction in cost has come with a reduction in reliability. VoIP requires a reliable Internet connection and mains power, to mention two points of failure.

VoIP technology has made inroads not only among consumers, but also in the business world: Many organizations have replaced their traditional PBX with a PBX that operates over a VoIP service rather than a PSTN. The lower cost of a VoIP-based PBX has also brought the PBX within reach of smaller businesses that previously could not afford the high costs of a traditional PBX.

SUMMARY OF THE INVENTION

Disclosed is a hybrid onsite and cloud PBX providing enhanced failover mechanisms. A decentralized system managed through a web site allows for continued operation even when the primary systems fail. Phones connect to two PBX systems at the same time, one local and one at a remote location. The two PBX systems synchronize configuration data and media files between them.

The website can also be used to manage any number of systems allowing any size organization to manage every phone system in their organization from a single interface. In a preferred embodiment, the website interface manages all the PBX systems of an organization as a single larger system.

During normal operation, inbound and outbound calls are routed through the local PBX, which in turn is connected to a VoIP gateway. In the event of a failure of Internet service, the local PBX connects directly to the PSTN to forward and receive calls. The remote PBX can still run menus and voicemails, and forward calls to mobile phones for extensions so configured without going through the onsite PBX in order to save PSTN lines. As a last resort, an incoming call is forwarded to the local PBX over the PSTN. When the local PBX is offline, the remote PBX handles inbound and outbound calls.

An additional feature of the hybrid PBX is that the website may be used to forward calls to a particular extension to an external device, such as a mobile phone. Since the configuration of both the local PBX and the remote PBX may be managed through the website, calls may be forwarded to a mobile phone even when the local PBX is not functioning. In most cases, the remote PBX will be configured to automatically forward to the mobile phones associated with extensions when the local PBX is non-operative.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 illustrates a business telephone system using a PBX;

FIG. 2 illustrates a business telephone system using a VoIP-based PBX;

FIG. 3 illustrates the relation between a hybrid cloud PBX of the present invention and the various networks and entities it interacts with;

FIG. 7 illustrates the connection of analog extensions to the onsite and remote PBX using analog telephone adapters;

FIG. 8 illustrates the connection of analog extensions to the onsite and remote PBX using an intermediate analog PBX;

FIG. 14 illustrates administrator user interface elements for managing a hybrid cloud PBX through a website;

FIG. 15 illustrates administrator user interface elements for managing an extension in a hybrid cloud PBX through the website;

FIG. 18 illustrates user interface elements allowing a user to manage an extension in a hybrid cloud PBX through the website.

DETAILED DESCRIPTION

Figure 3:
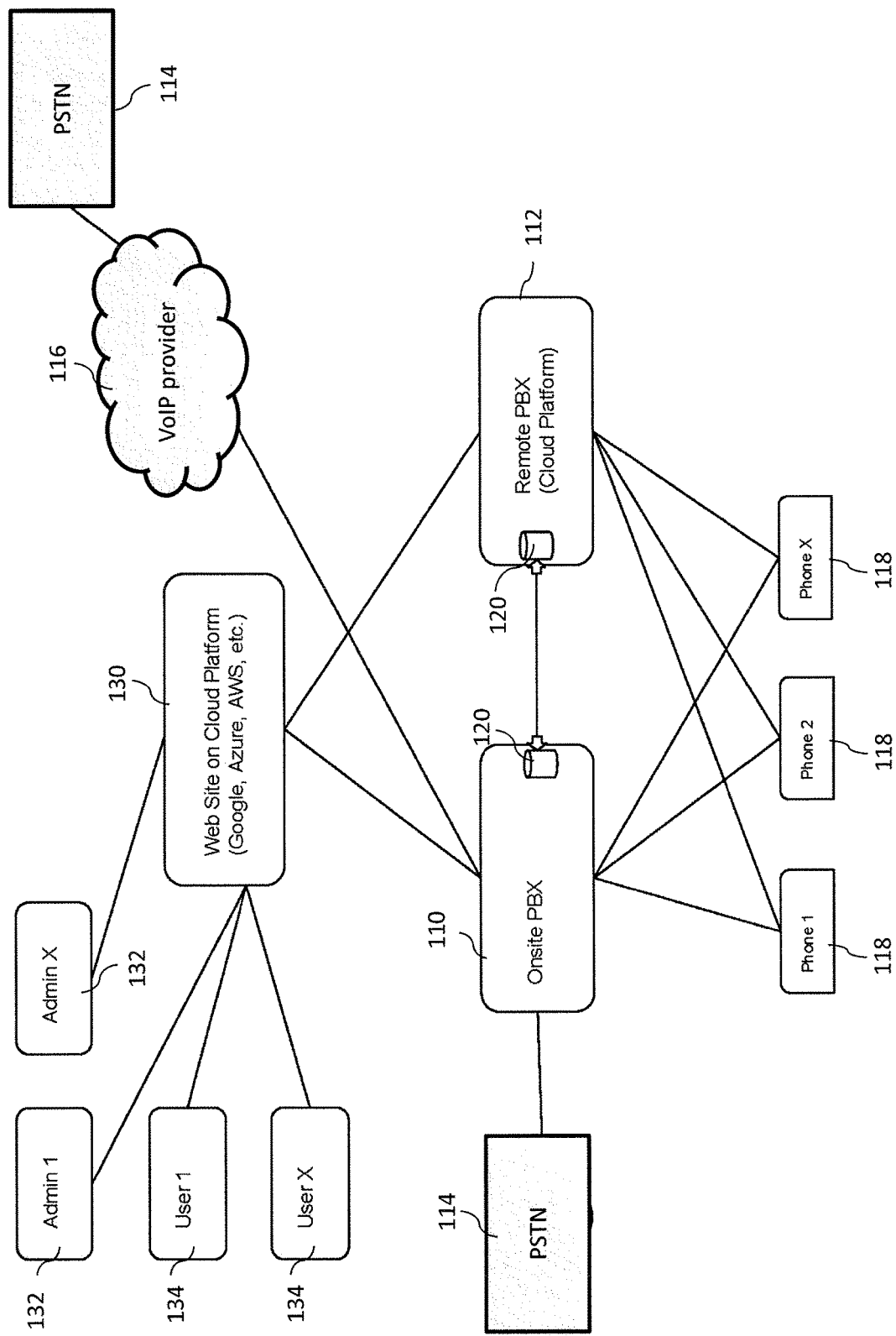

Referring initially to FIG. 1, a prior art business telephone system is shown and generally designated 10. Telephone system 10 comprises a PBX 12 with multiple extensions 14. Extensions 14 may include telephones, fax machines, and other devices which connect to the telephone network. Lines 16 between the PBX 12 and the PSTN 18 are shared between the extensions 14. Since all extensions 14 will not generally be making outgoing calls at the same time, there are usually fewer lines 16 connecting the PBX 12 to the PSTN 18 than there are extensions 14 in the PBX 12. Thus one purpose of the PBX 12 is to allow efficient use of a small number of lines 16 between a larger number of users (represented by extensions 14). Moreover, a call from one extension 14 to another extension 14 is routed by the PBX 12 without the necessity of occupying a line 16, allowing for interoffice telephone calls without using the resources of the PSTN 18.

Referring now to FIG. 2, a prior art VoIP business telephone system is shown and generally designated 20. Telephone system 20 comprises a PBX 22 with multiple extensions 24. PBX 22 connects to a VoIP gateway 26, which provides PBX 22 with a connection to the PSTN 28. The extensions 24 of PBX 22 may include telephones, fax machines, and other devices which connect to the telephone network. Standard telephones, fax machines, and other devices may be used, or telephones, fax machines, and other devices specifically designed for VoIP may be used and may provide access to special features provided by the PBX.

Referring now to FIG. 3, a hybrid cloud PBX is shown, comprising an on-site private branch exchange (commonly and hereinafter referred to as a "PBX") 110 and a remote PBX 112. Onsite PBX 110 and remote PBX 112 are identical or substantially similar, sharing the same configuration parameters and differing at most in some hardware elements. For example, the onsite PBX 110 may have hardware for connecting directly to extensions that use RJ11 jacks). Also, in preferred embodiments, onsite PBX 110 is capable of operating its external lines through a public switched telephone network (commonly and hereinafter referred to as a "PSTN") 114 and through a VoIP provider 116. A number of phones 118 connect to both onsite PBX 110 and remote PBX 112. Onsite PBX 110 and remote PBX 112 each maintain a copy of database 120 comprising configuration information for the hybrid cloud PBX.

Configuration of the hybrid cloud PBX is performed through a web site 130, which may be hosted on a cloud platform. Administrators 132 use the website 130 to perform configuration tasks such as adding or removing extensions. Users 134 perform configuration tasks related to their assigned extension, such as setting voicemail options or prompts. The website 130 provides configuration changes over the Internet to the onsite PBX 110 and the remote PBX 112.

For simplicity in description, the extensions of the hybrid PBX are represented as phones 118 in FIGS. 3 through 6. However, it will be apparent to those skilled in the art that the extensions may also connect other devices, such as fax machines, modems, or any device configured for operation in conjunction with the telephone network.

Although a single onsite PBX 110 and a single remote PBX 112 are described herein for simplicity, it is fully contemplated that multiple onsite PBXs 110, multiple remote PBXs 112, or multiple of both may be used depending on the needs and circumstances of the organization, such as for additional redundancy or to service multiple sites. Moreover, preferred embodiments use multiple websites 130 for redundancy and traffic balancing.

Figure 4:
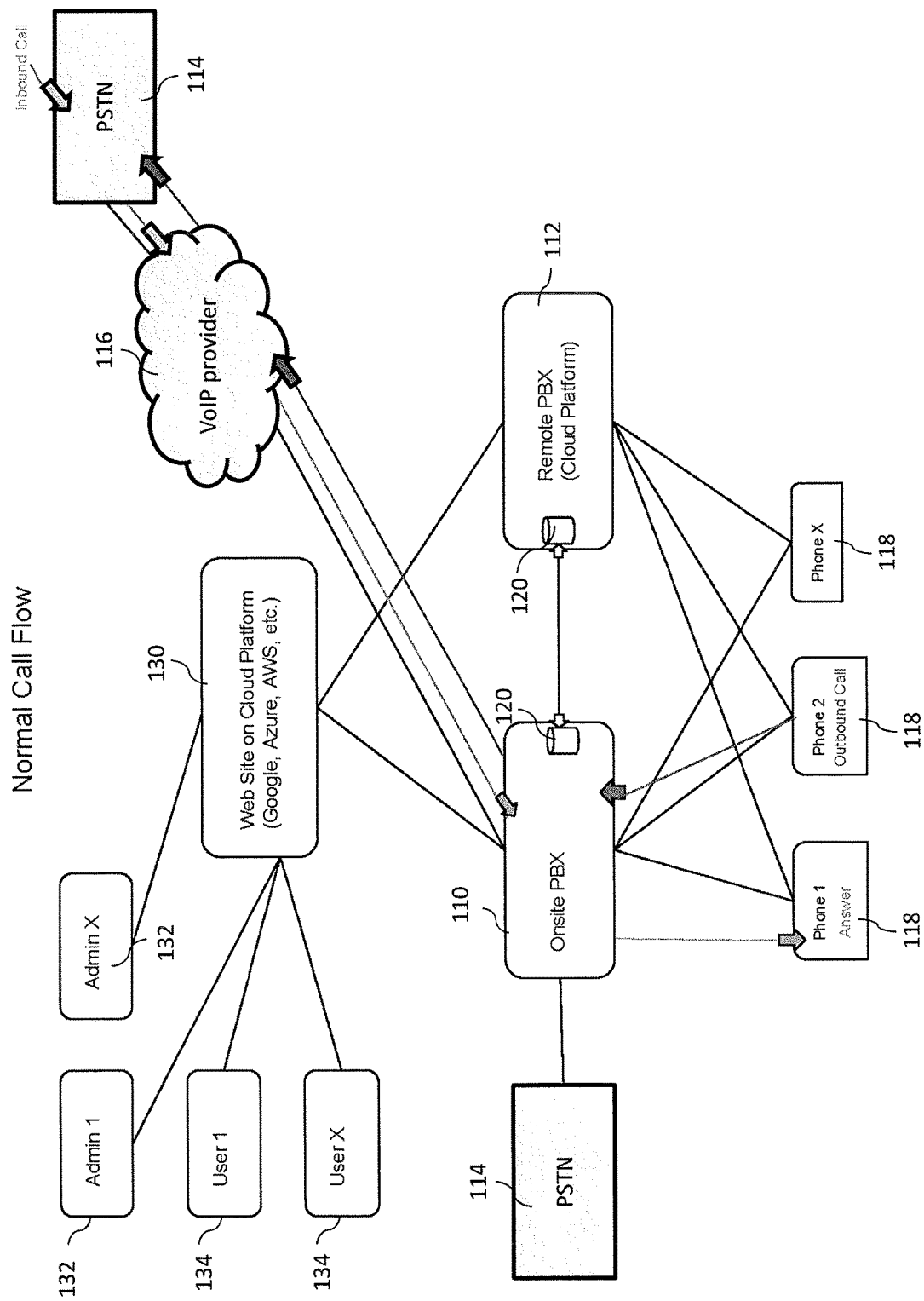
FIG. 4 illustrates the flow of telephone calls through the hybrid cloud PBX under normal circumstances.

Referring now to FIG. 4, the normal call flow through the hybrid cloud PBX is illustrated. An inbound call comes through a PSTN 114 to VoIP provider 116, and from VoIP provider 116 to onsite PBX 110, from where the call is routed to the desired phone 118. An outbound call takes the opposite route: from a phone 118, it connects to the onsite PBX 110, and from there to VoIP provider 116, to the PSTN 114, and ultimately to its destination.

Figure 5:
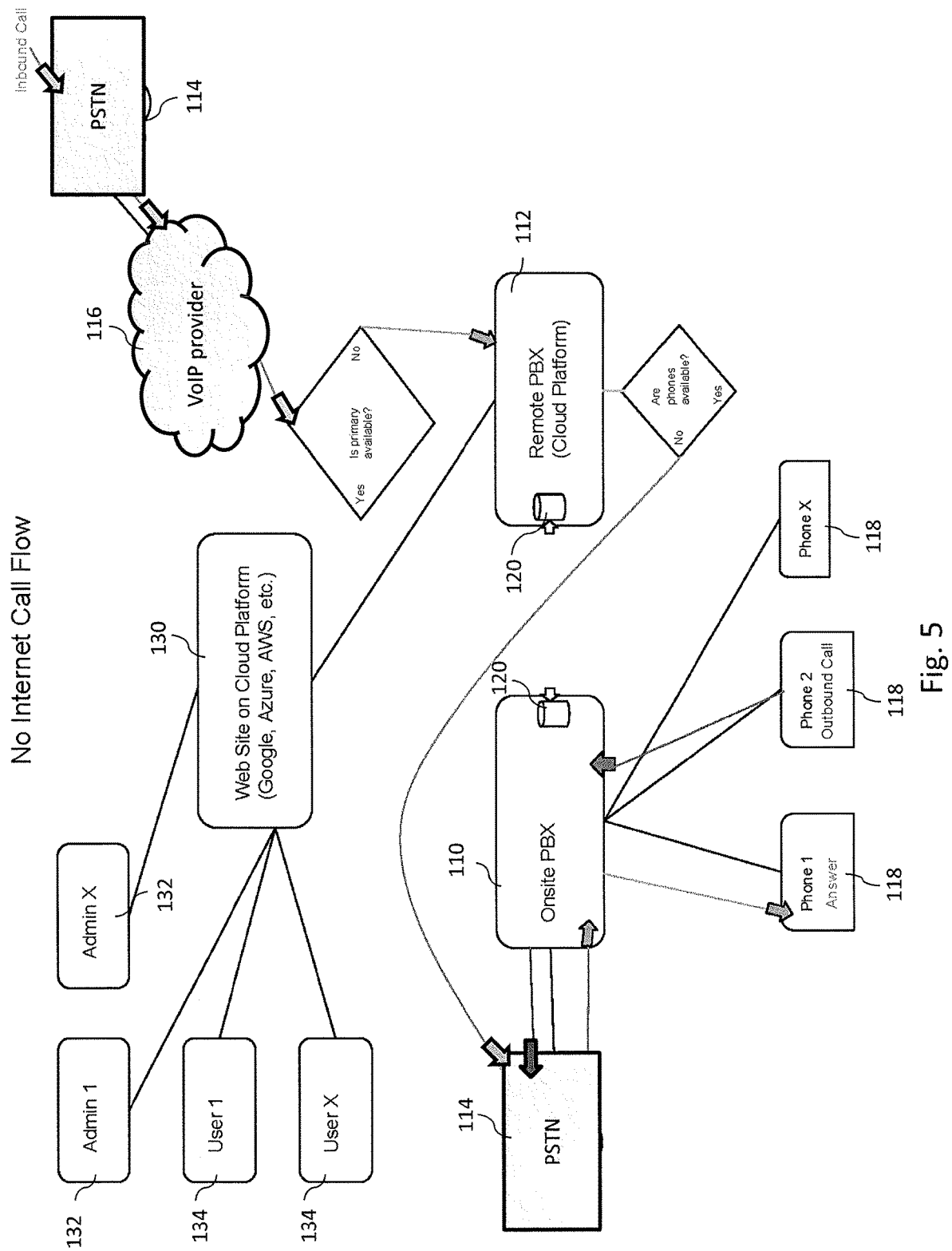
FIG. 5 illustrates the flow of telephone calls through the hybrid cloud PBX when Internet access is unavailable onsite.

Referring now to FIG. 5, when the onsite Internet connection is interrupted, phones 118 are unable to connect to the remote PBX 112, and the onsite PBX 110 cannot connect directly to the VoIP provider 116. When VoIP provider 116 cannot connect to the onsite PBX 110, an incoming call is directed from the VoIP provider 116 to Remote PBX 112. Remote PBX 112, unable to connect to extensions 118, directs the calls to the PSTN 114 to which the onsite PBX 110 is connected. The call is routed from PSTN 114 through onsite PBX 110 to a phone 118. An outgoing call from a phone 118 is routed by onsite PBX 110 to PSTN 114 and on to its destination. In order to limit costs, a fewer number of lines from onsite PBX 110 directly to PSTN 114 may be available than the number of lines from onsite PBX 110 to VoIP provider 116; in such circumstances, a fewer number of calls may take place during an Internet outage, so the organization may decide to limit outgoing calls during the outage in order to keep lines open for calls to emergency services.

Without onsite Internet access, changes made through the website 130 cannot be propagated directly and immediately to the onsite PBX 110, although the changes would be propagated to remote PBX 112. The configuration changes would later be synchronized with onsite PBX 110 when the onsite Internet connection is restored.

In an alternative embodiment, the remote cloud PBX 112 will communicate configuration changes received from website 130 to the offline onsite PBX 110 through the PSTN 114. In this way, configuration changes may be applied even when the onsite Internet connection is interrupted, although there may be some delay in the application of the changes due to the necessity of communicating them to the onsite PBX 110 over the standard telephone network, PSTN 114.

Figure 6:
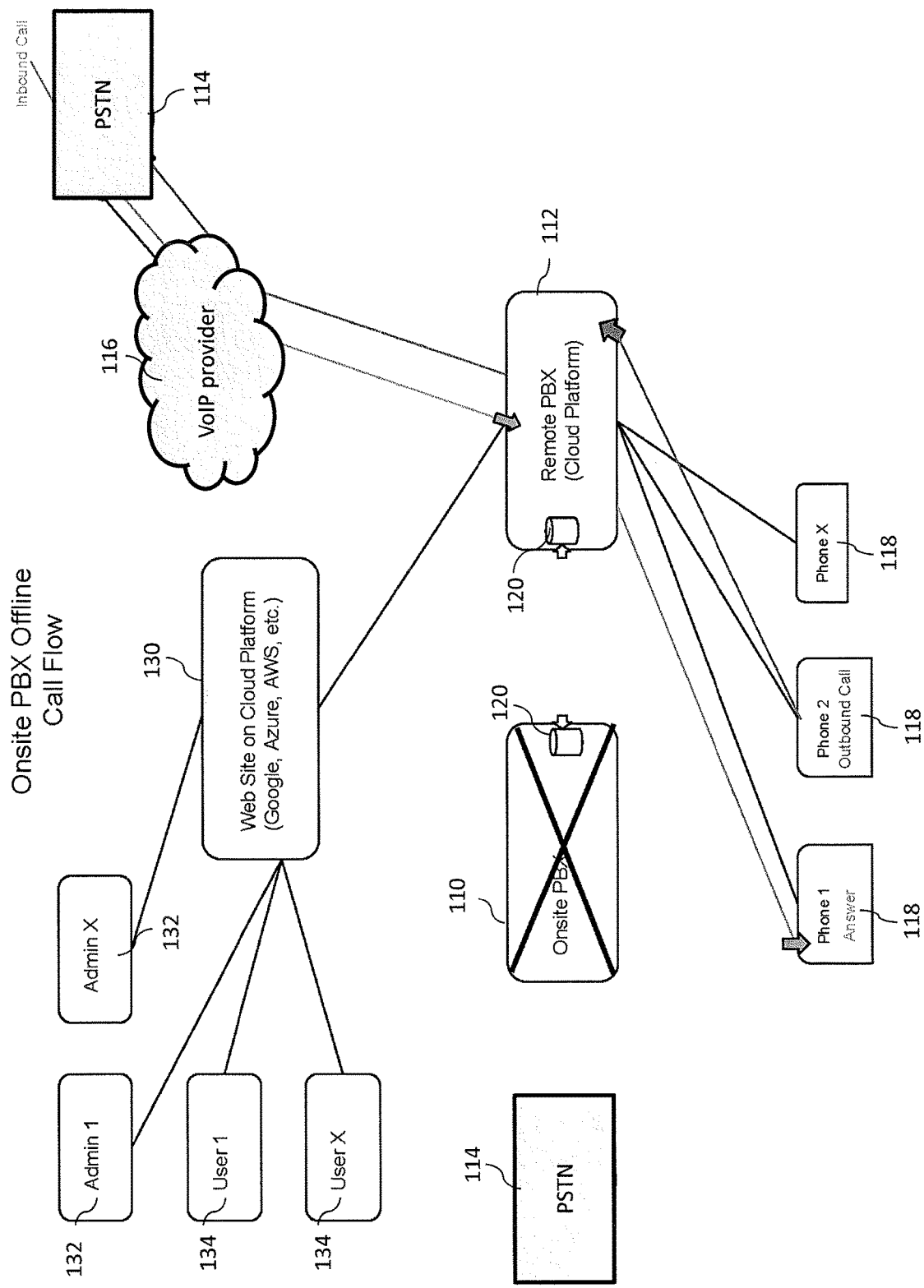
FIG. 6 illustrates the flow of telephone calls through the hybrid cloud PBX in the event of a failure of the onsite PBX or when the onsite PBX is otherwise not operative.

Referring now to FIG. 6, when the onsite PBX 110 is offline, calls are routed through the remote PBX 112, allowing phone service to continue uninterrupted. An incoming call is directed from the VoIP provider 116 to the remote PBX 112, which in turn directs the call over the Internet to a phone 118. An outgoing call from a phone 118 is routed over the Internet to remote PBX 112, and from there to VoIP provider 116, to PSTN 114, and ultimately to its destination.

A device configured for use with traditional (or "analog") telephone service requires a foreign exchange station ("FXS"), that is, an RJ11 jack through which is provided power, a dial tone, and traditional line signaling protocols. In an embodiment, onsite PBX 110 differs from remote PBX 112 in that FXS ports are provided by onsite PBX 110 for analog devices, including analog telephones and analog fax machines. In this way, analog extensions may connect to the business telephone system, but do not benefit from automatic rollover to the remote PBX 112 when the onsite PBX 110 is inoperative.

As shown in FIG. 7, the benefits of the hybrid PBX may be enjoyed by an analog extension 140 through the use of an analog telephone adapter ("ATA") 142. Each analog extension 140 is connected to an ATA 142, which provides an RJ11 jack, DC power, and traditional line signaling to the analog extension 140, and connects to the onsite PBX 110 and the remote PBX 112 using traditional Internet protocols. In conjunction with an ATA 142, an analog extension 140 interacts with the onsite PBX 110 and remote PBX 112 much the same as any other extension 118, and enjoys the benefits of automatic rollover of service to remote PBX 112 when onsite PBX 110 in not operating.

Referring now to FIG. 8, in certain circumstances, such as when there are many analog extensions 140, it may be desirable to use an intermediate PBX 144 to connect analog extensions 140 to the onsite PBX 110 and the remote PBX 112. Intermediate PBX 144 provides FXS ports for the analog extensions 140, while VoIP-enabled extensions 118 connect directly to the onsite PBX 110 and the remote PBX 112. In a preferred embodiment, intermediate PBX 144 differs from traditional PBX setups in that it provides a one-to-one ratio of analog extensions 140 to "external" lines to each of the onsite PBX 110 and the remote PBX 112, allowing analog extensions 140 to act transparently as if they were individual extension to the onsite PBX 110 and the remote PBX 112, just like extensions 118.

Figure 9:
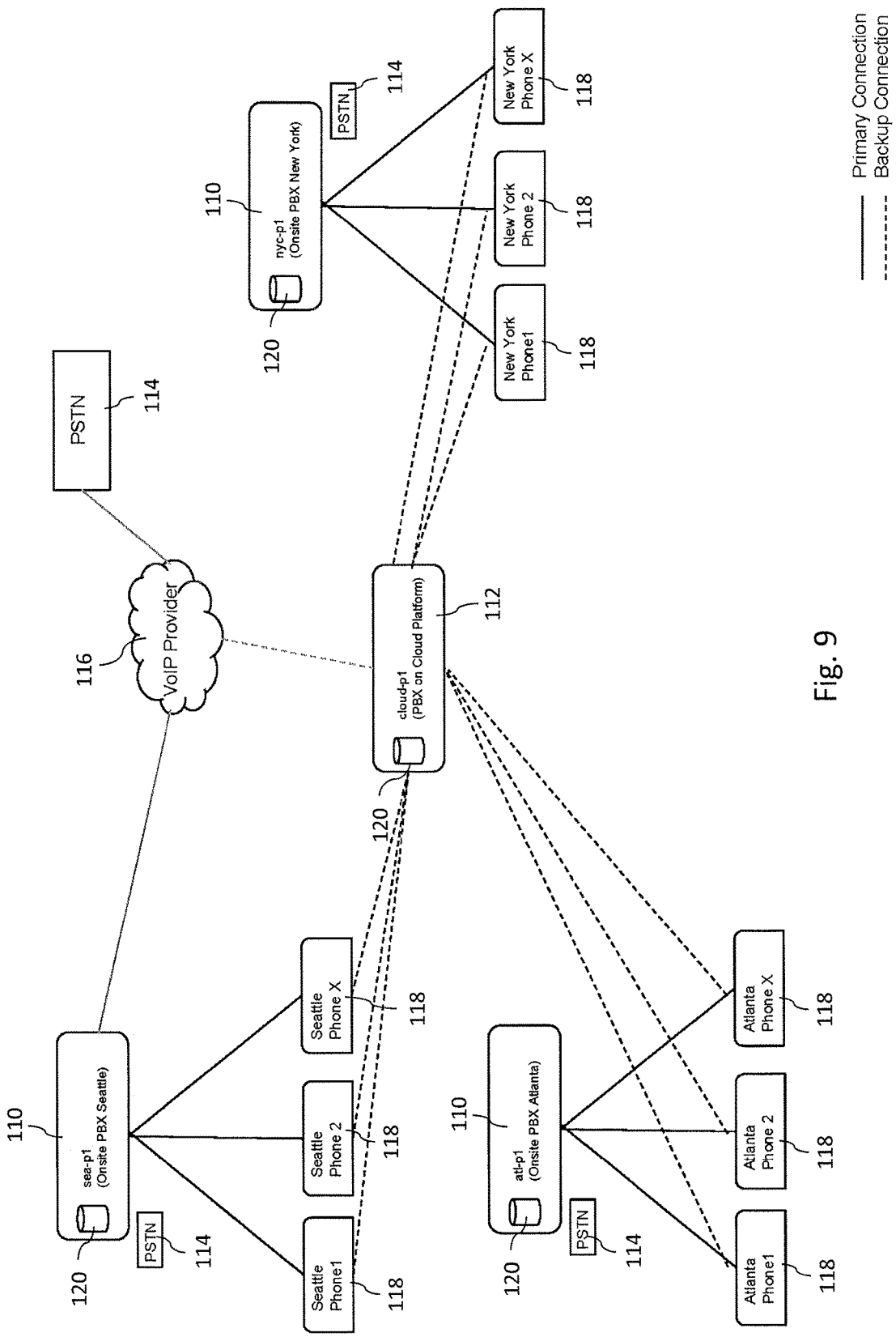
FIG. 9 illustrates a hybrid cloud PBX with multiple onsite PBXs connected to a single backup PBX.

Referring now to FIG. 9, an organization may have multiple offices in distinct locations. A remote PBX 112 can serve as a backup to several onsite PBXs 110 in different locations. In a preferred embodiment, remote PBX 112 runs on a cloud platform, allowing each extension 118 in each location to connect to it through the Internet, as well as allowing each onsite PBX 110 to synchronize with it over the Internet. In a preferred embodiment, each onsite PBX 110 will have a connection to VoIP provider 116, and from the perspective of the onsite PBX 110, the rest of the hybrid PBX will appear and function as described in connection with FIG. 3.

Figure 10:
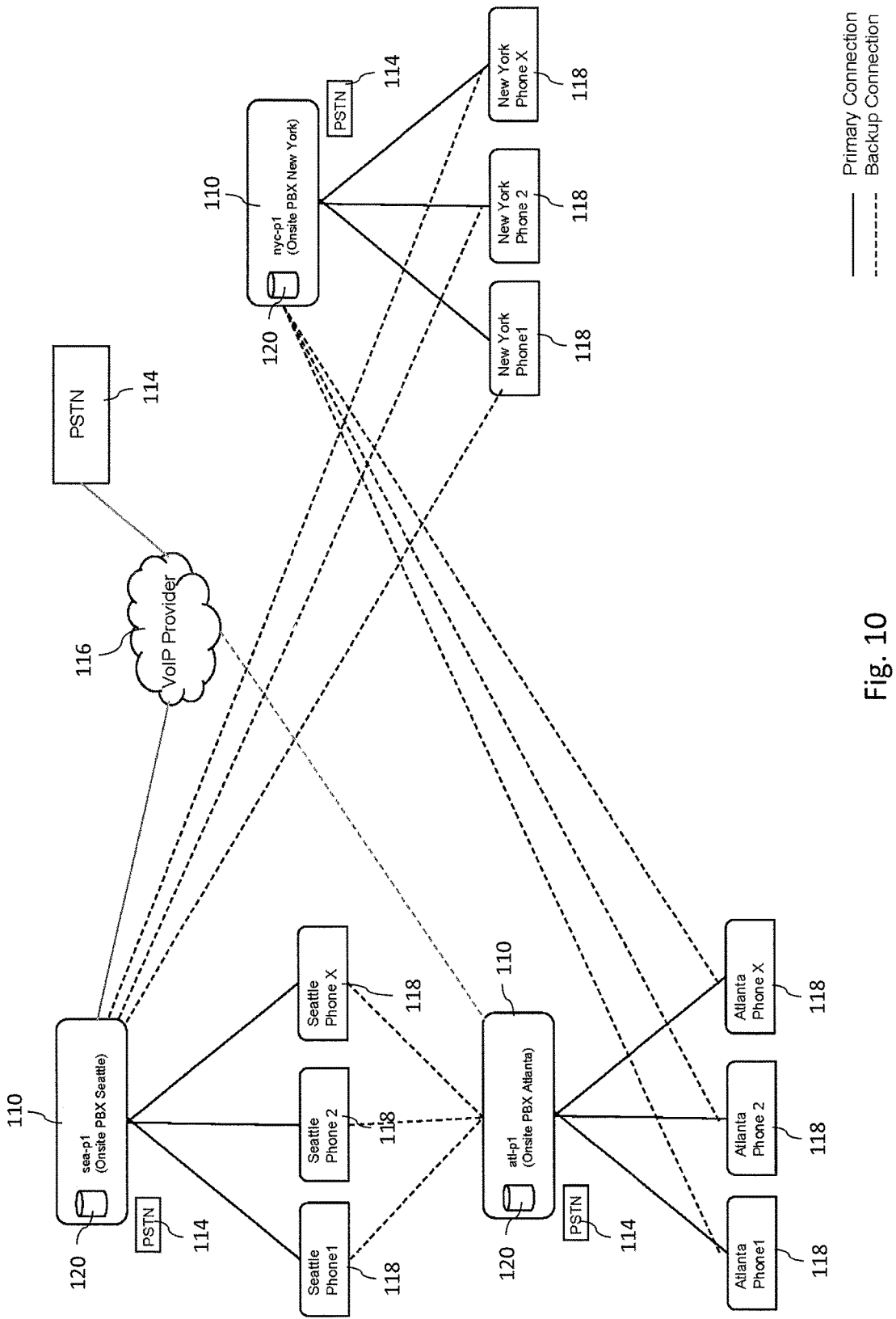
FIG. 10 illustrates a hybrid cloud PBX with multiple onsite PBXs in which each onsite PBX acts as a remote backup PBX to the other onsite PBXs.

Referring now to FIG. 10, a configuration of a preferred embodiment of the hybrid cloud PBX is shown, in which each onsite PBX 110 acts as a remote PBX 112 for other onsite PBXs 110 in other locations. An onsite PBX 110 has a connection to VoIP provider 116, to PSTN 114, or to both. Databases 120 are synchronized between the onsite PBXs 110. When one onsite PBX 110 is inoperative, the extensions 118 at that location make and receive calls through another onsite PBX 110 just as if the other onsite PBX 110 were a remote PBX 112.

Figure 11:
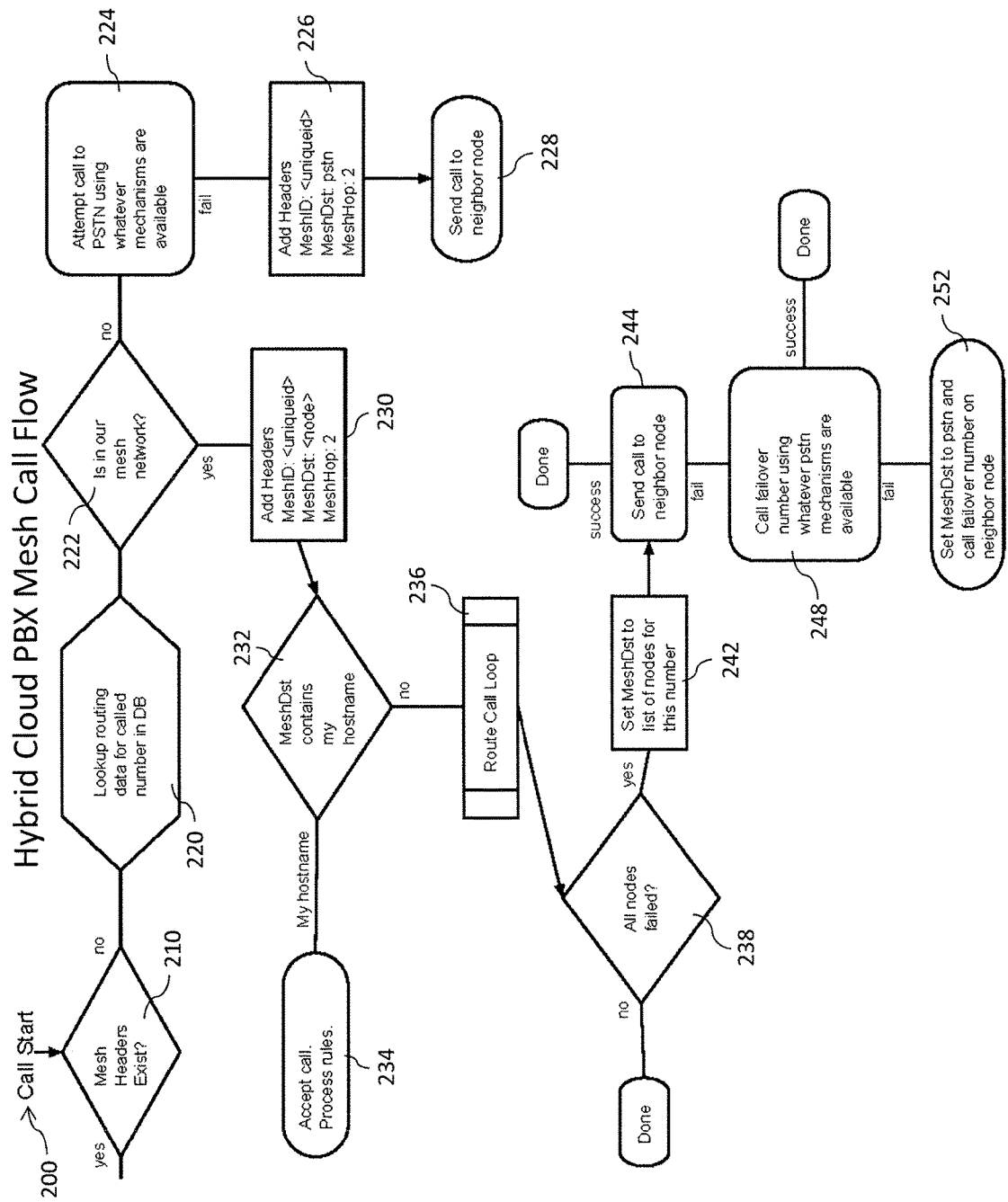
FIG. 11 illustrates a portion of a preferred embodiment of the call flow through a hybrid PBX.
Figure 12:
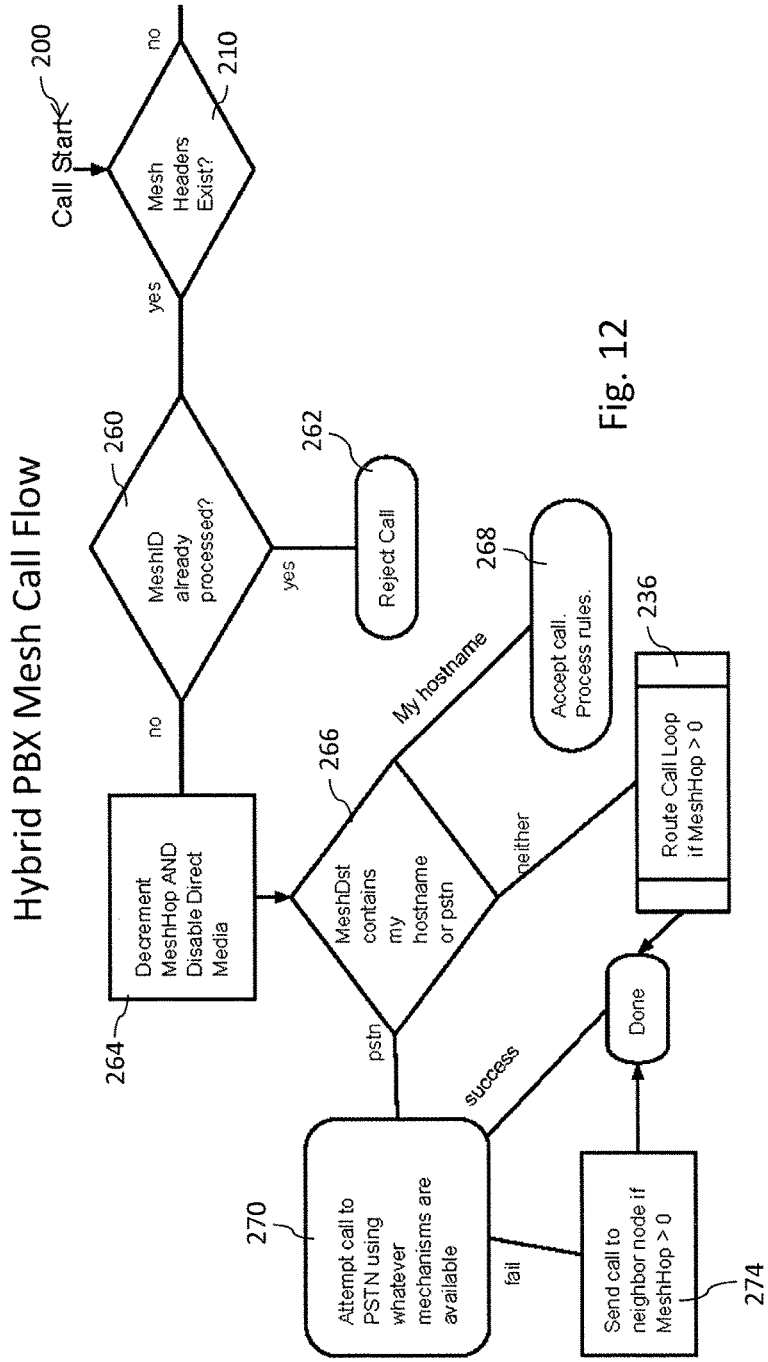
FIG. 12 illustrates another portion of a preferred embodiment of the call flow through a hybrid PBX.
Figure 13:
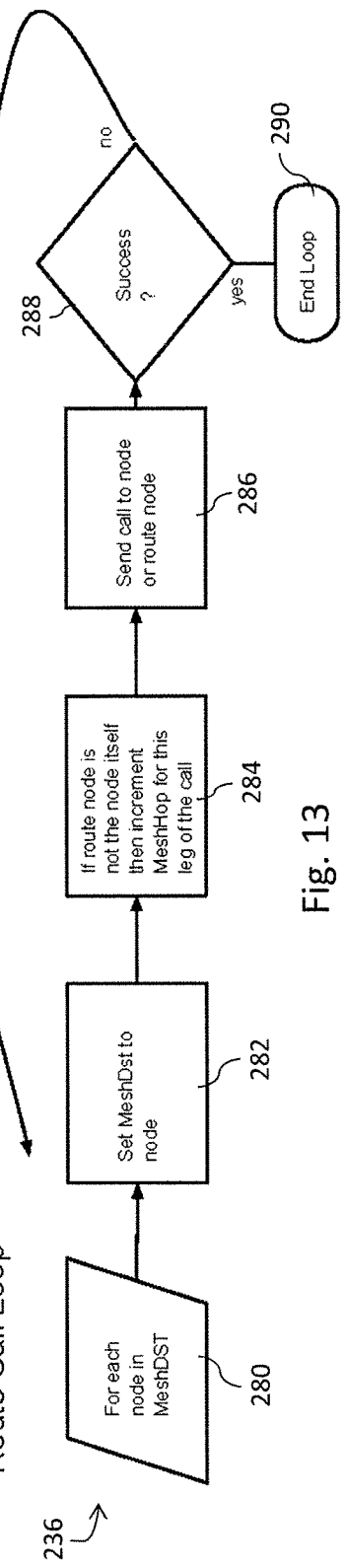
FIG. 13 illustrates the route call loop used in a preferred embodiment of the call flow through a hybrid PBX.

FIGS. 11-13 illustrate a method for routing calls used in a preferred embodiment of the hybrid PBX. Failover between an onsite PBX 110 and a remote PBX 112 can operate by using a floating IP address or an intermediary proxy server which directs messages to onsite PBX 110 when available and remote PBX 112 otherwise. Nonetheless, failover and load balancing can be performed by implementing the hybrid PBX as a mesh network. Operation as a mesh network allows calls to be routed between a primary PBX and its backups without introducing any new potential points of failure. The mesh network can be implemented primarily in the application layer of an existing network, such as the Internet, which allows the hybrid PBX to operate primarily over the existing network, but gives it the flexibility to include nodes on other networks. Onsite PBXs 110 and remote PBXs 112 operate as nodes on the mesh network, and a node may complete a call itself, pass it on to a PSTN or VoIP provider, or pass it to a neighboring node.

To accomplish the goals of the mesh network, mesh call control headers (hereinafter "mesh headers") are used. In a preferred embodiment, SIP headers are used to implement the mesh headers. Alternative embodiments use other call control protocols. Among the mesh headers are a globally unique ID ("MeshID"), a destination header ("MeshDst") to specify which node should handle the call, and a hop count ("MeshHop") to prevent endless traversal of the whole mesh network while passing calls between nodes.

As shown in FIG. 11, the call flow begins with a call 200 arriving at a node, which may originate from an extension 118, a VoIP provider 116, the PSTN 114, or another node. Upon receipt of the call, the node determines 210 whether mesh headers exist.

If there are no mesh headers for the call, the node looks up 220 routing data for the number being called in database 120. Based on the routing data, the node determines 222 whether the called number is within the mesh network. If not, the node attempts 224 to make the call to VoIP provider 116, if available. If the node is not connected to VoIP provider 116 or otherwise cannot make the call, it attempts to make the call directly to the PSTN 114, if available. If it is unable to make the call through its own available resources (e.g. the VoIP provider and the PSTN), then it adds 226 a set of mesh headers designating the VoIP provider 116 or the PSTN 114 as the destination in the MeshDst header and passes 228 the call to a neighboring node.

If the number being called is in the mesh network—that is, the number is an extension 118 connected to an onsite PBX 110 (or a remote PBX 112 if its onsite PBX is unavailable)—the node adds 230 mesh headers designating the onsite PBXs 110 and/or remote PBXs 112 to which the called extension 118 is connected as the destination in the MeshDst header. The node then determines 232 whether the destination contains the node's hostname. If so, the node 234 accepts and handles the call. Otherwise, the route call loop 236 is used to iterate through destination nodes.

If the route call loop 236 failed 238 to send the call to a destination, the node sets 242 the destination in the MeshDst header to a list of nodes for the called number and sends 244 the call to a neighboring node. If the node is unable to send the call to a neighboring node, the node calls 248 a failover number using the connected VoIP provider 116 or PSTN 114, if available. If no resources are available on the node to call the failover number, the node sets 252 the destination header to the VoIP provider 116 or PSTN 114 and sends it to a neighboring node to make the call.

As seen in FIG. 12, if mesh headers already exist on the call when received by the node, the node then determines 260 based on the MeshID header whether the call has already been processed. If so, then the call is rejected 262. Otherwise, the node decrements 264 the MeshHop header and "disables direct media," that is, allows the call audio to follow the same path along the network as the call control packets. Generally call audio should take the most direct path between nodes and the VoIP provider 116, but in order to get around a bad connection or avoid a route known to have packet loss, it may be necessary to route the audio through the nodes used to connect the call.

The node then determines 266 whether the MeshDst header contains the node's hostname, instructions to make the call through VoIP provider 116 or PSTN 114, or neither. If MeshDst contains the node's hostname, the node accepts 268 and handles the call. If MeshDst indicates that the call is to be directed to the VoIP provider 116 or the PSTN 114, the node directs 270 the call through the appropriate mechanism, if available. Otherwise, it sends 274 the call to a neighboring node to do so, as long as the MeshHop header is greater than zero. If MeshDst contains neither the node's hostname nor instructions to direct the call outside the mesh network, the route call loop 236 is used to iterate through destination nodes.

As seen in FIG. 13, the route call loop 236 iterates 280 through each node in the MeshDst header. During each iteration, MeshDst is set 282 to the node being iterated over. MeshHop is incremented 284 if the route to the node in MeshDst is indirect, and the call is sent 286 to the node being iterated over or the route node. If the call is successfully processed 288, the loop ends 290; otherwise, the loop iterates 280 over the next node.

Referring now to FIGS. 14 through 18, preferred embodiments of the hybrid cloud PBX can be managed through an Internet website interface, hosted on website 130. Unique to the hybrid cloud PBX, the single website interface is used to control the configuration of two PBXs at a time: onsite PBX 110 and remote PBX 112, which maintain identical configurations. To be precise, a configuration option is adjusted once in the website interface, as if a single PBX were being configured, and the website 130 communicates the configuration option change to both onsite PBX 110 and remote PBX 112, which implement the change as soon as they receive it. In some embodiments, for simplicity, the website communicates the configuration directly to one of either onsite PBX 110 or remote PBX 112, and the changes are automatically synced to the other. In embodiments having multiple PBXs 110 in a mesh network, the routing database is replicated to all mesh nodes. In an alternative embodiment, the database is implemented and updated over the network as a blockchain.

The use of website 130 to configure both the onsite PBX 110 and remote PBX 112 allows for an organization's continued cell phone availability even when the organization's ability to operate onsite is curtailed, such as during a major disaster or even a simple LAN outage. Ideally, a mobile phone number corresponding to the extension will already have been entered into the website 130 before the downtime, and thus be present in the database 120. If the cell forward setting were set to "only on down," the forwarding would automatically take place. However, in some circumstances the field may not have been completed or updated before the downtime. Thus, if the organization's LAN is unavailable, preventing extensions 118 from connecting either to onsite PBX 110 or remote PBX 112, the website 130 may be accessed by an external Internet source, such as a mobile phone, and instructed to forward the calls to each extension 118 (or to selected extensions 118) to the mobile phone number of the user of the extension 118.

As seen in FIG. 14, a navigation tool 300, comprising a menu bar in preferred embodiments, allows a website 130 user to access the various features of the website 130 to set up and manage accounts of other users, create PBX extensions, delete PBX extensions, configure PBX extensions, configure overall PBX options, access call records including listings of calls made and recordings, among other features that may be available. Users are identified by user accounts and divided into categories such as "administrator" and "user." The features which a user may access may be limited by the user's category and individual permission settings in the user's account. For example, generally only an administrator may set up new accounts, but a user may be permitted to adjust configuration options on his or her own extension. In some embodiments, a "site administrator" category allows a user to adjust configuration options on a particular PBX.

FIG. 15 shows some user interface elements, designated 320, associated with the configuration of a single extension 118. Among the various configuration options, field 322 allows for entry of a cell phone number of the user associated with the extension being configured. Field 324 allows for control of when calls to the extension are forwarded to the cell phone number in field 322; options include forwarding calls only when a PBX is down and never forwarding calls to the extension. Preferred embodiments include additional options, among them forwarding calls that remain unanswered after a specified number of rings, always forwarding calls. Some embodiments support forwarding calls during certain times, including during predetermined time frames for forwarding, including after business hours, on weekends, and both after business hours and on weekends.

Figure 16:
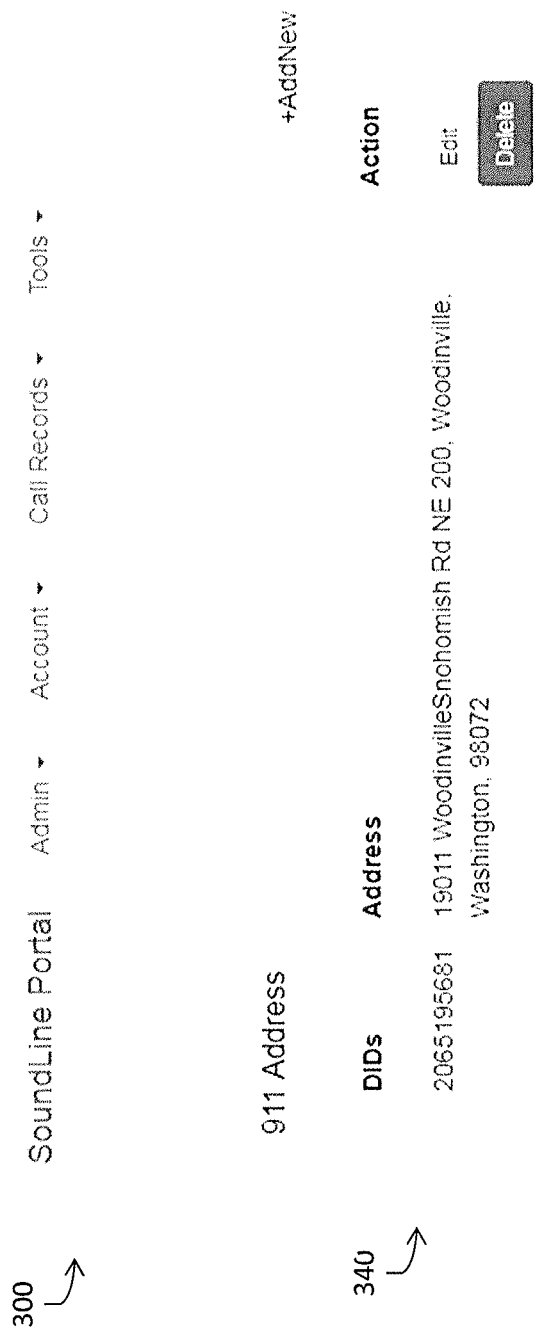
FIG. 16 illustrates administrator user interface elements for setting an address for 911 calls from a hybrid cloud PBX through the website.

FIG. 16 shows user interface elements 340 for setting the address associated with direct inward dialing ("DID") numbers for routing emergency calls. The address is also provided to the emergency operator receiving the call.

Figure 17:
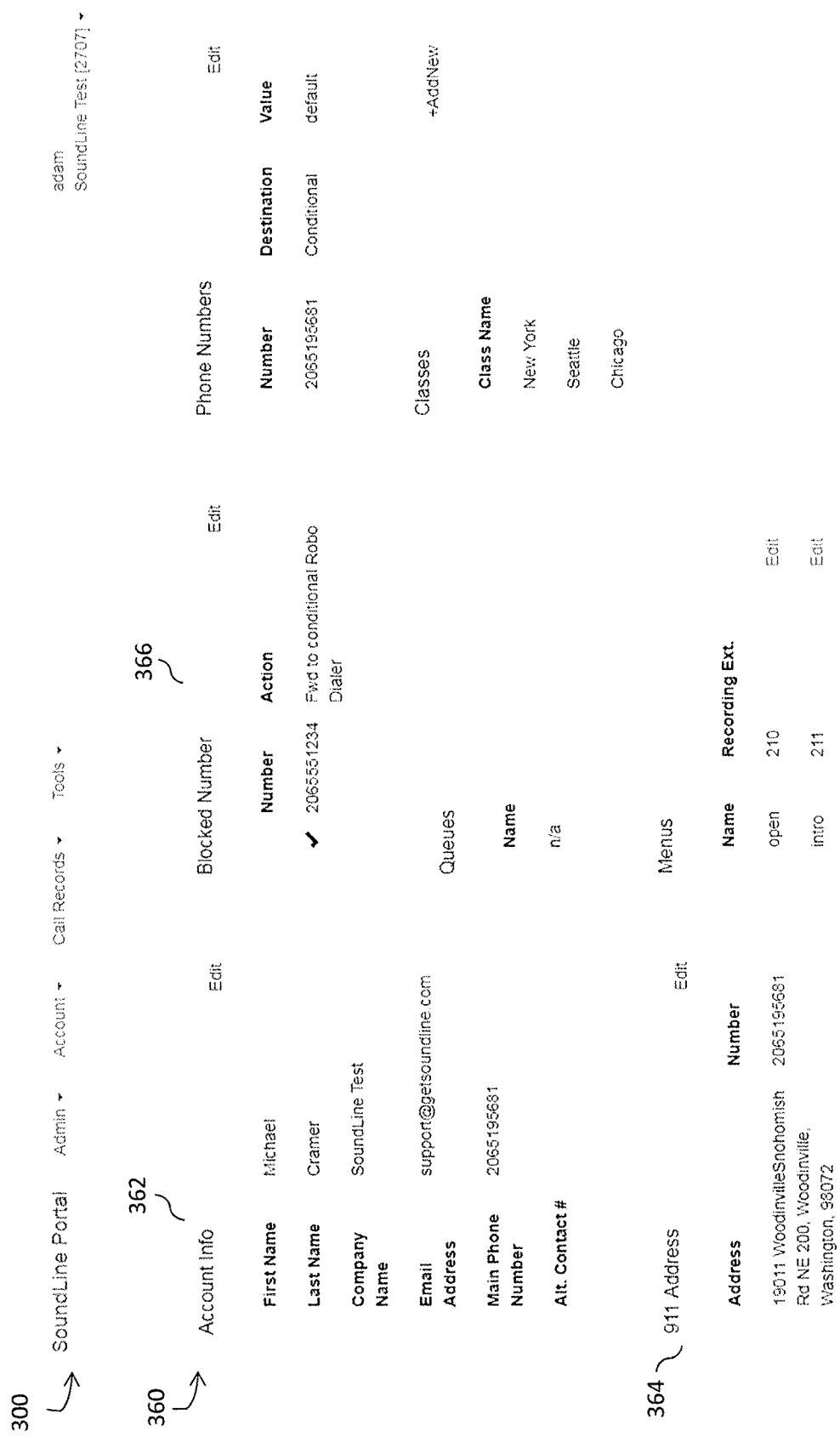
FIG. 17 illustrates user interface elements for configuring a user's account in a hybrid cloud PBX through the website.

Shown in FIG. 17 are user interface elements 360 for a user of the "user" (non-administrative) category. Among the interface elements available are elements 362 for viewing and editing general account information, elements 364 for viewing and editing the addresses for routing emergency calls, and elements 366 for blocking calls from user-specified phone numbers.

FIG. 18 shows user interface elements 380 allowing a user of the "user" category to view and edit configuration options for an extension, as well as to delete the extension. The options available are a subset of those available to administrative users, some of which are shown in FIG. 15.

While there have been shown what are presently considered to be preferred embodiments of the present invention, it will be apparent to those skilled in the art that various changes and modifications can be made herein without departing from the scope and spirit of the invention.

What is claimed is:

1. A hybrid PBX, comprising:
   an onsite private branch exchange (PBX);
   a remote PBX;
   a website operative to configure the onsite PBX and remote PBX as a single system;
   one or more extensions; and
   at least three inbound call flows, comprising a normal call flow, a no-internet call flow, and an onsite-PBX-offline call flow,
   wherein each extension of the one or more extensions is connected to both the onsite PBX and the remote PBX, and
   wherein the remote PBX is operative to facilitate calls made and received by the extensions when the onsite PBX is inoperative, and
   wherein the normal call flow routes calls via a voice over Internet protocol (VoIP) provider through the onsite PBX to an extension of the one or more extensions, the no-internet call flow routes calls via the VoIP through the remote PBX and a public switched telephone network (PTSN) to an extension of the one or more extensions, and the onsite-PBX-offline call flow routes calls via the VoIP through the remote PBX to an extension of the one or more extensions.

2. The hybrid PBX as recited in claim 1, wherein the local PBX and the remote PBX are connected to a cloud platform to receive configuration changes from the website.

3. The hybrid PBX as recited in claim 2, wherein the local PBX is configured to route outbound calls through a PSTN in the event of a failure of Internet service, and wherein the remote PBX is configured to receive voicemails and is configurable to forward calls to mobile phones when the onsite PBX is inoperative in order to minimize use of PSTN lines.

4. The hybrid PBX as recited in claim 1, further comprising means for connecting one or more analog extensions to both the onsite PBX and the remote PBX.

5. The hybrid PBX as recited in claim 1, further comprising a proxy server which routes calls through the onsite PBX when the onsite PBX is operative, and through the remote PBX when the onsite PBX is inoperative.

6. The hybrid PBX as recited in claim 1, further comprising a mesh network which routes calls through either the onsite PBX or the remote PBX based on availability and load balancing.

\* \* \* \* \*